United States Patent [19]

McNabney

[11] 4,352,453
[45] Oct. 5, 1982

[54] FAN CONTROL FOR VARIABLE AIR VOLUME TERMINAL UNIT

[75] Inventor: John C. McNabney, Harwinton, Conn.

[73] Assignee: Interpace Corporation, Parsippany, N.J.

[21] Appl. No.: 226,567

[22] Filed: Jan. 19, 1981

[51] Int. Cl.³ .............................................. G05D 23/13
[52] U.S. Cl. ..................................... 236/13; 98/38 F; 165/16; 236/49
[58] Field of Search ................. 98/38 D, 38 E, 38 F, 98/38 A; 236/13, 49; 165/16; 415/13, 48; 417/43

[56] References Cited

U.S. PATENT DOCUMENTS

| | | | |
|---|---|---|---|
| 2,440,052 | 4/1948 | Lingen et al. | 236/13 |
| 2,705,595 | 4/1955 | Carlson et al. | 236/13 |
| 2,721,704 | 10/1955 | Patrick | 415/48 |
| 2,981,474 | 4/1961 | Drummond et al. | 236/13 |
| 3,028,800 | 4/1962 | Anderson | 236/49 X |
| 3,123,294 | 3/1964 | Donahue | 236/13 |
| 3,916,987 | 11/1975 | Giansante | 165/46 |
| 3,951,205 | 4/1976 | Zilbermann | 165/16 |
| 4,109,704 | 8/1978 | Spethmann | 165/16 |
| 4,196,849 | 4/1980 | Dehart et al. | 236/49 |
| 4,210,278 | 7/1980 | Obler | 165/16 X |
| 4,284,237 | 8/1981 | Harris et al. | 236/49 |

Primary Examiner—William E. Tapolcai

[57] ABSTRACT

Disclosed is a terminal unit for an air conditioning system. The apparatus has a common chamber for primary and secondary air and a throttling valve at the primary air duct connection controlled by a zone thermostat. The terminal unit fan is independently controlled by an air flow sensor located ahead of the throttling valve in order to prevent fan overload.

3 Claims, 2 Drawing Figures

FAN CONTROL FOR VARIABLE AIR VOLUME TERMINAL UNIT

BACKGROUND OF THE INVENTION

1. Field of the Invention

The present invention generally appertains to new and novel improvements in air conditioning systems wherein a central supply of hot or cold air is distributed to remote locations as in large commercial, office-type buildings. At these remote locations there is generally a fan powered terminal unit or induction unit that is thermostatically controlled. Remote location control is essential since demand can vary significantly due to such variables as exposure and distance from an exterior wall.

2. State of the Prior Art

Fan powered variable-air-volume (VAV) terminal units have been used extensively. Ducting is provided to connect the cold or hot air supply to a plurality of terminal units. Each of these units has a mixing chamber in order to mix hot or cold air (primary air) with air originating from the zone to be conditioned (secondary air). Mounted within the terminal unit is an inlet damper or throttling valve that provides the control of primary air delivered to the unit. Also mounted within the unit is a blower or fan which causes the mixed primary and secondary air to flow from the interior of the unit through an outlet into the zone to be conditioned. A temperature sensing means is located in the air conditioned zone controlling the inlet damper and the power to the fan. The thermostatic sensing means may be electrical but more frequently in commercial installations, pneumatic systems are used. A pneumatically controlled system with these features is disclosed in U.S. Pat. No. 3,951,205. The problem with this prior art arrangement is that there is only a marginal correlation between the air flow through the throttling damper and the thermostat signal which also turns on the fan. Since the fan is usually a forward curved centrifugal wheel which has a distinct overloading characteristic on increasing air flow, if the fan is turned on while the primary air flow exceeds the design capacity for the fan, it is possible to overload the fan motor.

SUMMARY OF THE INVENTION

The primary object of this invention is to provide fan control that is independent of the wall thermostat and solely controlled by the volume of primary air passing through the throttling damper. This is accomplished by locating a flow sensor in the primary air inlet to activate an air flow switch and energize the fan. This air flow switch can be set to turn the fan on when the primary air volume reaches a predetermined level. This eliminates the likelihood of motor overload caused by the excessive air volume attempting to be delivered by the fan.

DESCRIPTION OF THE PREFERRED EMBODIMENT

Figure 1:
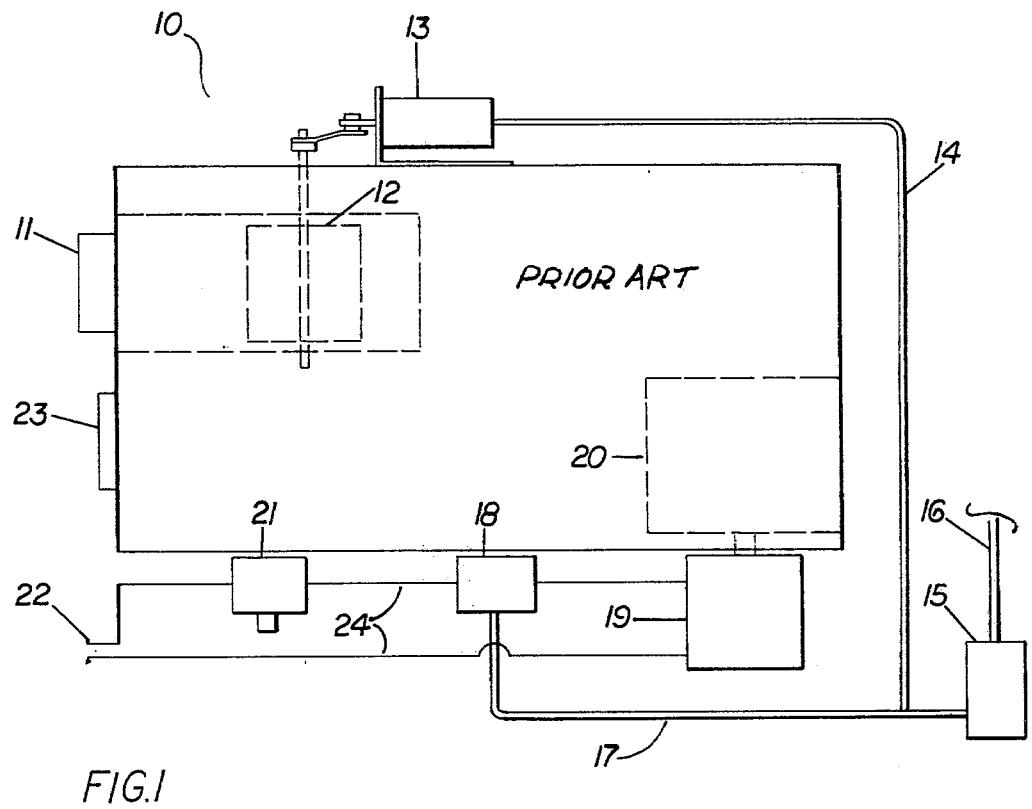
FIG. 1 is a schematic diagram of a pneumatically controlled terminal unit representing the prior art.

Referring to the drawings, there is shown in FIG. 1 a terminal unit 10 of prior art design. A central utility means (not shown) can be located in a remote section of a large building and can be one of many commercially available power units which can generate a volume of conditioned air to be transported to the individual terminal units located at the zones to be conditioned, through an appropriate ducting system, and would be connected to terminal unit 10 at inlet 11. The amount of conditioned air entering the terminal unit is controlled by throttling damper 12 actuated by pneumatic operator 13. Connected to actuator 13 is pressurized air line 14 coming from zone thermostat 15. The system pressure is obtained through main feed 16 which is connected to a centrally located air compressor (not shown).

Also, connected to the same zone thermostat is air line 17 terminating at pneumatic switch 18. When air lines 14 and 17 are pressurized by zone thermostat 15, the valve 12 will close, reducing pressurized primary air and switch 18 will close providing power to fan motor 19, actuating fan 20. Electric power to the pneumatic switch is fed through disconnect switch 21 from power source 22 through conductors 24. Secondary air is also circulated by fan 20 through ducting connection 23. It is obvious to one skilled in the art that the primary air volume and fan operation have poor correlation. Although no harm can result when the fan is on and low primary air volume exists, with the reverse, extreme fan overload can occur.

Figure 2:
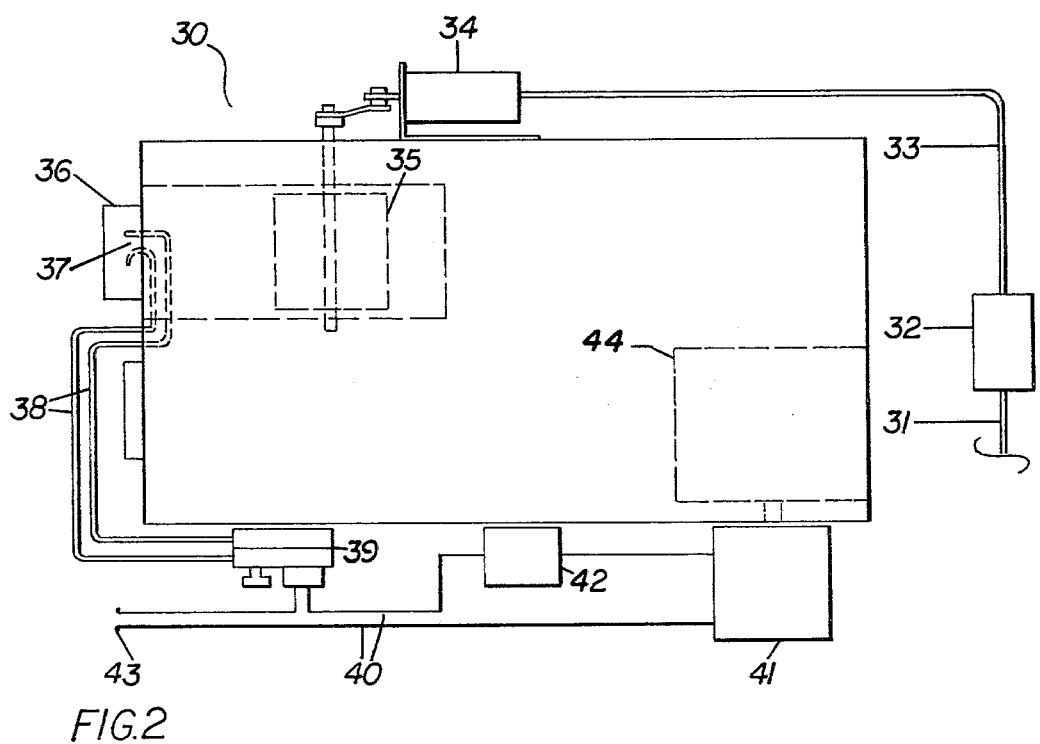
FIG. 2 is a schematic diagram of a pneumatically controlled terminal unit representing the teaching of the present invention.

Referring to FIG. 2, it can be seen that terminal unit 30 is generally of similar construction to that shown in FIG. 1. Compressed air main 31 feeds pneumatic thermostat 32 and by means of pipeline 33 provides compressed air to valve actuator 34 to operate throttling valve 35 for primary air. In the instant invention; however, control of fan 44 is completely independent of the throttling damper controls.

Located within the primary air duct connection 35, ahead of throttling damper 36 is a flow sensor 37. Air flow switch 39 actuated by a differential air pressure thru air lines 38 can be set to go on at a predetermined volume of primary air. As the primary air flow is increased by the room thermostat to the point where it equals the predetermined fan volume, the fan is deactivated, thus preventing fan overload. As primary air flow falls below the predetermined fan volume, the fan is activated. A closed electrical switch 39 would feed power to fan motor 41 along conductors 40 from power source 43. A conventional disconnect switch 42 would be inserted in power lines 40 for emergency shut-off purposes.

Due to this fan control system, excessive pressures on fan 36 will not be possible and it will be protected against overloading.

Obviously, many modifications and variations of the present invention are possible in light of the above teachings. It is, therefore, to be understood, that within the scope of the appended claims, the invention may be practiced by those of ordinary skill in the art otherwise than as is specifically described herein.

What is claimed is:

1. An air conditioning system terminal unit comprising:

a mixing box with a primary air inlet communicating with a source of pressurized air, a secondary air inlet, and an outlet;
an electric fan located at the outlet;
a throttling valve located at the primary air inlet;
throttling valve controls comprising means responsive to the temperature at a preselected location actuating the throttling valve; and
flow sensing means located in the primary air duct, ahead of the throttling valve, actuating the fan at a predetermined volume of primary air, independent of the throttling valve controls.

2. The combination set forth in claim 1 wherein the throttling valve is actuated by compressed air originating at a zone pneumatic wall thermostat.

3. The combination set forth in claim 1 wherein the flow sensing means is of the air pressure type, actuating an air flow switch which energizes the terminal unit fan.

* * * * *

UNITED STATES PATENT AND TRADEMARK OFFICE
CERTIFICATE OF CORRECTION

PATENT NO. : 4,352,453
DATED : October 5, 1982
INVENTOR(S) : John C. McNabney

It is certified that error appears in the above—identified patent and that said Letters Patent is hereby corrected as shown below:

column 2, line 43 - "35" should be --36--.

Signed and Sealed this

Twenty-fifth Day of January 1983

[SEAL]

Attest:

Attesting Officer

GERALD J. MOSSINGHOFF
Commissioner of Patents and Trademarks